United States Patent

Crossman et al.

(10) Patent No.: US 6,723,683 B2
(45) Date of Patent: Apr. 20, 2004

(54) COMPOSITIONS FOR CONTROLLED RELEASE

(75) Inventors: Martin C. Crossman, Hixson, TN (US); James A. Rosie, Milton Keynes (GB); Daniel B Solarek, Hillsborough, NJ (US)

(73) Assignee: National Starch and Chemical Investment Holding Corporation, New Castle, DE (US)

(*) Notice: Subject to any disclaimer, the term of this patent is extended or adjusted under 35 U.S.C. 154(b) by 193 days.

(21) Appl. No.: 09/924,179

(22) Filed: Aug. 7, 2001

(65) Prior Publication Data
US 2003/0032562 A1 Feb. 13, 2003

(51) Int. Cl.⁷ .............................. C09K 7/00
(52) U.S. Cl. .............. 507/111; 507/212; 507/902; 507/90; 507/920; 507/921; 507/927; 507/930; 507/931; 507/939; 507/110; 507/118; 507/211; 507/221
(58) Field of Search ........... 507/111, 212, 507/90, 939, 927, 920, 921, 930, 931, 118, 110, 211, 221, 902

(56) References Cited

U.S. PATENT DOCUMENTS

| | | | |
|---|---|---|---|
| 3,601,194 A | * 8/1971 | Gallus | 166/283 |
| 3,989,632 A | * 11/1976 | Fischer et al. | 507/107 |
| 4,045,360 A | * 8/1977 | Fischer et al. | 507/90 |
| 4,192,753 A | * 3/1980 | Pye et al. | 507/103 |
| 4,481,121 A | * 11/1984 | Barthel | 507/138 |
| 4,614,599 A | * 9/1986 | Walker | 507/103 |
| 4,704,214 A | 11/1987 | Russell et al. | 252/8.514 |
| 5,204,183 A | 4/1993 | McDougall et al. | 428/402.24 |
| 5,354,786 A | 10/1994 | Lau | |
| 5,546,798 A | 8/1996 | Collee et al. | 73/152.09 |
| 5,560,439 A | 10/1996 | Delwiche et al. | 175/325.1 |
| 5,628,813 A | 5/1997 | Chem et al. | 71/64.02 |
| 5,710,108 A | * 1/1998 | McNally et al. | 507/110 |
| 5,922,652 A | 7/1999 | Kowalski et al. | 507/129 |
| 6,279,656 B1 | * 8/2001 | Sinclair et al. | 166/310 |
| 6,461,999 B1 | * 10/2002 | Fanta et al. | 507/111 |

FOREIGN PATENT DOCUMENTS

| | | |
|---|---|---|
| WO | WO 89/04842 | 6/1989 |
| WO | WO 99/51701 | 10/1999 |
| WO | WO 01/10976 | 2/2001 |
| WO | WO 02/24938 | 3/2002 |

\* cited by examiner

*Primary Examiner*—Philip C. Tucker
(74) *Attorney, Agent, or Firm*—Karen G. Kaiser

(57) ABSTRACT

The present invention relates to biodegradable chemical compositions wherein core substrates, particularly oil well chemicals, are adsorbed onto particulate starch, particularly granular starch, providing a stable, controlled release formulation suitable for use in oil field applications. The invention further relates to the process of preparing obtaining these compositions.

2 Claims, No Drawings

COMPOSITIONS FOR CONTROLLED RELEASE

FIELD OF THE INVENTION

The present invention relates to biodegradable chemical compositions in which a chemical, particularly at least one oil well chemical, is adsorbed onto particulate starch, particularly granular starch, providing a stable, controlled release formulation suitable for use in oil field applications. The invention further relates to the process of preparing these compositions.

BACKGROUND OF THE INVENTION

The application of coating materials on various substrates is a well known technique for controlling or delaying the release of that substrate when deteriorate. For example, the encapsulation of an oil well chemical intended to be functional in a subterranean oil recovery operation insulates the chemical from immediate contact with the environment into which it is introduced, thereby maintaining the integrity of the chemical and preventing undesirable agglomeration or reaction until the chemical may be released in the desired location.

A variety of chemical compositions are conventionally used as controlled release agents in the food, cosmetic, paint, pharmaceutical, personal care, household, and polymer and oil field industries. Conventional controlled release compositions typically operate as encapsulating agents and include gum arabic, dextrins, low viscosity modified starches, arabinogalactan, gum acacia, casein, gelatin, carboxymethyl cellulose, tragacanth, karaya, sodium alginate, tannin, and celluloses.

Solubilized starches having been disclosed as agents for use in oil field encapsulation technology. U.S. Pat. No. 4,704,214, for example, describes the use of polysaccharides and polyols to form matrices for encapsulating various ingredients, especially oil field chemicals. In this case, a polysaccharide, which may be starch, is solubilized to form an inert film that surrounds an oil absorbent polymer. The film subsequently melts or slowly dissolves, releasing the oil-swelling polymer, which then closes off fractures or large pores without clogging the borehole of the oil well. The encapsulation of a wide range of oil field chemicals is also discussed in U.S. Pat. No. 5,922,652 wherein a complex colloid, which may be a gelatinized starch, forms a coacervate with water-immiscible droplets of the chemical. U.S. Pat. No. 5,546,798 discloses that starch may be used as a water soluble thickening agent in conjunction with a swelling clay and a sealing agent such as calcium carbonate in order to encapsulate and thus preserve oil field core sample integrity. These forms of encapsulation all require the use of solubilized or non-particulate starch in their encapsulation formulation.

The use of particulates, both soft and hard, are also known controlled release ingredients for use in oil field applications. As discussed in U.S. Pat. Nos. 5,560,439 and 5,204,183, typical particulates are calcium carbonate, clays, urea, polyvinyl acetate powder or emulsions. Particulates are often used as fillers or swelling agents in conjunction with water soluble thickening agents such as polyethylene glycols, polyethylene glycol or a sulfonated elastomeric polymer. In particular, U.S. Pat. No. 5,628,813 describes the use of a lignosulfonate coating containing a particulate, such as talc, $TiO_2$, silica, clays or gypsum which functions as a filler. The lignosulfonate coating is a secondary encapsulation intended to protect a thin, water permeable polymeric coating for encapsulating pharmaceuticals, agricultural chemical and oil well chemicals. There remains a continuing need for a variety of controlled release agents that may be modified to suit a number of environments, particularly oil field applications.

Accordingly, it has now been discovered that particulate starch desirably adsorbs chemicals, thereby providing stable, controlled release chemical compositions suitable for oil field applications.

SUMMARY OF THE INVENTION

The present invention relates to chemical compositions in which the chemical, particularly at least one oil well chemical, is adsorbed onto particulate starch. The particulate starch of the present invention includes granular starch and, resistant starch made therefrom, particularly granular starch.

The preparation of the present chemical compositions comprises mixing the chemical with the particulate starch. Adjuncts useful in controlled release formulations may optionally be added to the mixture. The mixture may also be optionally subjected to further treatment so that a stable, free-flowing chemical composition is obtained.

The chemical compositions of this invention are advantageously biodegradable and exhibit good controlled release properties, particularly in oil well applications.

DETAILED DESCRIPTION OF THE INVENTION

The present invention relates to controlled release chemical compositions in which the chemical, particularly at least one oil well chemical, is adsorbed onto particulate starch. The invention further relates to the process of obtaining these compositions and their method of use.

Use of starch as a carrier for the oil well chemical offers many advantages over those carriers generally used in the industry. For example, the starch is biodegradable and provides a good environmental profile.

The term starch particulate as used herein is intended to include starches with a highly organized structure, including granular starches and resistant starches made therefrom.

All granular starches and flours (hereinafter "starch") may be suitable for use herein and may be derived from any native source. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starch derived from a plant grown from artificial mutations and variations of the above genetic composition, which may be produced by known standard methods of mutation breeding, are also suitable herein.

Typical sources for the starches are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. A used herein, the term "waxy" is intended to include a starch containing at least about 95% by weight amylopectin and the term "high amylose" is intended to include a starch containing at least about 40% by weight amylose.

Conversion products which retain their granular structure may be derived from any of the starches, including fluidity or thin-boiling starches prepared by oxidation, enzyme conversion, acid hydrolysis, heat and or acid dextrinization, and or sheared products may also be useful herein.

Particularly useful are granular structures, which have been "pitted" by the action of enzymes or acid, leaving a still organized structure which creates a microporous starch. The enzymatic or acid hydrolysis of the starch granule is carried out using techniques well known in the art. The amount of enzyme used is dependent upon the enzyme, i.e., type, source and activity, as well as enzyme concentration, substrate concentration, pH, temperature, the presence or absence of inhibitors, and the degree and type of modification. Types of modifications are described herein, infra. These parameters may be adjusted to optimize the nature and extent of the "pitting" of the starch granule.

Another particulate starch useful in the controlled release applications of the present invention is resistant starch. Resistant starch is commonly known as a starch not likely to be adsorbed in the small intestine of a healthy individual. Granular or particulate starches, such as of the RS2-type (a starch granule that resists digestion by pancreatic alpha-amylase) and the RS4-type (a chemically modified starch, such as acetylated, hydroxyalkylated, or cross-linked starch) are particularly suitable. However, resistant starches of the RS3-type (retrograded, nongranular starch formed by heat/moisture treatment of starch) are also suitable for the instant invention due to their high level of retrogradation or crystallization from the alignment and association of associated amylose. In the case of an RS3-type of starch, the order present in the original granular state has been replaced with a crystalline order associated with retrograded amylose that may swell a bit in water but doesn't completely solubilize.

These types of resistant starch are well known in the art and may be exemplified by that disclosed in U.S. Pat. No. 5,593,503 which describes a method of making a granular resistant starch; U.S. Pat. Nos. 5,281,276 and 5,409,542 which describe methods of making resistant starches of the RS3 type; U.S. Pat. No. 5,855,946 which describes a method of making a resistant starch of the RS4-type; and U.S. Application Serial No. 60/157370, which describes the formation of a very highly resistant starch. The methods for making the resistant starches are described in the preceding references, the disclosures of which are incorporated herein by reference.

The starch particulate, including granular and resistant starches, may be modified by treatment with any reagent or combination of reagents which contribute to the controlled release properties of the starch, provided the modification does not destroy the particulate nature of the starch. Chemical modifications are intended to include crosslinked starches, including crosslinking the particulate starch with reactive polymers. Preferred reactive polymers include starches modified with aldehyde or silanol groups. Other chemical modifications include, without limit, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Preferred modified starches are starch acetates having a degree of substitution ("DS") of about up to about 1.5, particularly those disclosed in U.S. Pat. No. 5,321,132, thereby improving compatibility with synthetic hydrophobic materials. Such modifications are known in the art, for example in Modified Starches: Properties and Uses, Ed. Wurzburg, CRC Press, Inc., Florida (1986). Another particularly suitable modified starch is starch octenylsuccinate, aluminum salt.

Other suitable modifications and methods for producing particulate starches are known in the art and disclosed in U.S. Pat. No. 4,626,288 which is incorporated herein by reference. In a particularly useful embodiment, the starch is derivatized by reaction with an alkenyl cyclic dicarboxylic acid anhydride by the method disclosed in U.S. Pat. Nos. 2,613,206 and 2,661,349, incorporated herein by reference, or propylene oxide, more particularly by reaction with octenylsuccinic anhydride.

In choosing a suitable starch, one skilled in the art would look to its ability to absorb and carry the chemical without leakage. This is important as the chemical must arrive at its destination and not be lost along the way. For example, when an oil well chemical is used, the starch must carry the chemical along the pipe or umbilical until it reaches the oil well. Thus, the starch must be stable in a transport medium, such as an organic, aqueous, or MEG medium used in the oil field industry.

One skilled in the art would further look to the ability of the starch to release the chemical at its destination. Particulate starches effectively achieve this requirement. When the starch cooks out, it will release the adsorbed chemical. As different starches have different gelatinization temperatures, the starch may be chosen such that it will release its chemical at selected temperature such as at 60° C. desired in the particular application.

The particulate starches of the present invention, including granular starch and resistant starch, may be combined with chemical reagents, oil well chemicals in particular, to form the controlled release chemical compositions of the present invention.

Oil well chemicals in accordance with this invention include, without limit, friction reducers, corrosion inhibitors, wax inhibitors, hydrate inhibitors, gel breakers, tracers, surfactants, scale inhibitors, antifoaming agents, demulsifiers, pour point depressants, biocides, drag reducers, antioxidants, hyrogen sulfide scavengers, oxygen scavengers, deoilers, and asphaltene inhibitors. Such chemicals can be in either liquid or solid form.

Scale inhibitors is intended to include without limitation phosphates, phosphate esters and inorganic phosphates, and (co-polymers of acrylates, maeates and sulphonates. Corrosion inhibitors is intended to include without limitation amines and polyamines; biocides such as aldehydes or halopropionamides. Oxygen scavengers is intended to include without limitation sodium bisulfite.

Other oil well reagents such as those disclosed in U.S. Pat. No. 4,670,166, the disclosure of which is incorporated herein by reference, may also be suitable. Another category of oil well chemicals are the so-called breaker reagents which are introduced with fracturing fluids into subterranean formations to lower the viscosity of the fracturing fluid. Examples of such breaker reagents include without limitation sodium and ammonium persulfate, alpha and beta amylases and glucosideases and similar reagents such as disclosed in U.S. Pat. No. 4,506,734, the disclosure of which is incorporated herein by reference.

Particularly suitable oil well chemicals are corrosion inhibitors, wax inhibitors, gas hydrate inhibitors, and asphaltene deposition inhibitors. Corrosion inhibitors include without limit, non-quaternized long aliphatic chain hydrocarbyl N-heterocyclic compounds and mono- or di-ethylenically unsaturated aliphatic groups. Wax inhibitors include, without limit, polymers such polyethylene, or a copolymeric ester such as ethylene vinyl acetate copolymers, alpha olefin maleate, fumerate polyesters, and vinyl acetate polymers. Gas hydrate inhibitors may be any conventional hydrophilic hydrate inhibitor including, without limit, methanol, ethanol, hydroxy ethers, glycols, and ammonium chloride, sodium chloride or calcium chloride solutions. Asphaltene inhibitors include, without limit, amphoteric fatty acids or a salt of an alkyl succinate.

The controlled release chemical compositions of the present invention may optionally include additional adjuncts which improve controlled release or are themselves encapsulated by other encapsulation mediums known in the art. Possible adjuncts include, without limit, plasticizers, surfactants, fillers, chelating agents, thickening agents, particulates and other typical controlled release ingredients such as gelatin, gum arabic, zein, soy protein, and copolymer/polymers such as polyethylene and polyvinyl chloride.

Starch allows the compositions of the present invention to be made by a one-step adsorption process. The chemical compositions of the present invention may be prepared by mixing the desired oil well chemical with a starch particulate to form a mixture and stirring vigorously at ambient temperature and pressure. The amount of shear to which the starch/chemical mixture is exposed may need to be adjusted to ensure that the chemical is properly adsorbed onto the particulate starch.

Typically, the ratio of oil well chemical to starch is from about 30:70 to 80:20, more particularly from 40:60 to 60:40. Where practicable, the oil field chemical is first melted before adding the chemical to the starch particulate, especially if it is a wax inhibitor that is solid at room temperature. Optionally, at least one encapsulation adjunct and/or solvent may be included in the formulation mixture. Further, weighting agents may be added to minimize gravity separation of the composition with the oil well medium.

The formulation mixture may also be optionally subjected to further treatment so that a stable, free-flowing powder having controlled release properties is obtained. After obtaining the free-flowing powder, the encapsulated chemical composition is then optionally milled to a desirable particle size diameter, preferably less than 20 microns. The particle size of the present invention should be large enough to inhibit inhalation and to prevent powdering when handling.

Optional treatments for obtaining the controlled release chemical compositions of the present invention include, without limit, subjecting the formulation mixture to treatments such as vacuum batch thermal processing, roll compaction, fluid bed processing, spray drying and extrusion. These processing treatments are well known to one of ordinary skill in the art. The processing conditions of the treatment should be limited to those that produce a chemical composition in which the starch retains its particulate structure.

The resultant chemical compositions are in the form of a biodegradable, non-sticky, free flowing powder having controlled release properties. Upon release of the adsorbed chemical, the starch will be carried by the aqueous phase and discharged into the environment. In contrast, the use of a solubilized starch in the formulation mixtures produces a sticky mixture that is unsuitable for controlled release applications.

Selection of the starch controls the release profile. For example, a starch which breaks down more easily or under less severe conditions will release the starch more quickly. Typically, the uncooked starch breaks down at high temperature, and thus is released when introduced to an aqueous or organic carrier fluid, forcing the expulsion of the encapsulated material into the stream. However, the starch may be formulated to release under other conditions to which it would be exposed.

The present compositions protect then adsorbed material from that of the medium, e.g. oilwell fluids, with which it may not be compatible and/or soluble. The starch allows for two incompatible (or compatible) oil well chemicals to be carried in a medium. The starch also enables a higher loading of oil well chemical down in one injection line than without the starch and allows potentially hazardous materials to be handled easily and safely, limiting exposure. Further, the adsorption may make it possible to use materials that would otherwise have a flashpoint too low to be able to be used offshore.

The free flowing powder has preferable handling characteristics to the liquids when being used offshore. The dispersion of granular starch will be much easier than a fine powder if there is a high surface tension, or phase boundary, between the carrier starch and the oil well medium and is robust enough to be able to stand the shear stresses that will be employed to mix the material in the carrying medium. i.e. impellers.

The following examples are presented to further illustrate and explain the present invention and should not be taken as limiting in any regard.

EXAMPLES

The following oil field chemicals were used:

Corrtreat 2001-29, a solid, water soluble, amphoteric, betain-based surfactant for use as a corrosion inhibitor, commercially available from TR Oil Services Corrtreat 2001-30, a solid, trimercaptotriazine-based corrosion inhibitor, commercially available from TR Oil Services Hytreat 569, ethanediol 2-butoxyethanol propan-2-ol PV caprolactam for use as a kinetic hydrate inhibitor, commercially available from TR Oil Services Hytreat A560, quarternary ammonium 2-butoxyethanol diisobutyl ketone for use as an anti-agglomerate hydrate inhibitor, commercially available from TR Oil Services Scaletreat 2001-26, a solid, phosphate-based, water soluble scale inhibitor, commercially available from TR Oil Services, Scaletreat 2001-28, a solid, polymer-based, water soluble scale and corrosion inhibitor, commercially available from TR Oil Services Scavtreat 1020, a liquid, water miscible, triazine hydrogen sulphide scavenger, commercially available from TR Oil Services Trosquat, a liquid biocide formulation, commercially available from TR Oil Services Waxtreat 398—a liquid, EVA wax inhibitor, commercially available from TROil Services Waxtreat 7302—a liquid, resin-based asphaltene/wax dispersant, commercially available from TR Oil Services Example 1

This example illustrates a method of preparing the biodegradable controlled release chemical compositions of the present invention.

A granular starch (150 g, starch octenylsuccinate, aluminum salt, commercially available from National Starch and Chemical Company) was added to a pour point suppressant, XPC 3147C (50 g, Aldrich), which had been melted at a temperature greater than 30° C. The mixture was stirred at ambient temperature and pressure in a high shear disperser (Torrence, #785049) at 2000–4000 rpm. An additional 100 g of the granular starch was added to the mixture and stirred for two more minutes to form a fine, free-flowing powder.

Example 2

This example illustrates that the chemical compositions of the present invention comprising a particulate starch are superior to chemical compositions prepared with a solubilized starch.

Solubilized starch (250 g of a beta-amylase treated, 3% octenyl succinic anhydride modified waxy corn starch) was added to XPC 3147C (50 g, Aldrich) which had been melted at a temperature greater than 30° C. The mixture was stirred at ambient room temperature and pressure in a high shear disperser (Torrence) at 2000–4000 rpm.

The resultant solid was sticky to the touch and, unlike the superior free-flowing powder of Example 1, was unsatisfactory for use as a controlled release chemical composition.

Example 3

This example illustrates compositions of the present invention using water soluble oil well chemicals.

Water soluble solids were formulated with starch at a 1:1 ratio (50% loading on starch). The oil well chemical was solubilized in ambient water and homogenized for 1–2 minutes at 9000–10000 rpm (Silverson L4RT). The starch was then added to the solution and the mixture was further homogenized for 2–3 minutes at 9000–10000 rpm, 20° C. (Silverson L4RT). The mixture was spray dried (40% solids, 375° F. inlet temperature, 225° F. outlet temperature with a feed rate of 160 ml/minutes and dual wheel atomization using Bowen Lab Model (30"×36") to produce a flowable, non-sticky composition.

a. The example was carried out using a scale inhibitor, Scaletreat 2001-28, as the oil well chemical and Vulca 90, a maize starch crosslinked with 1.5% epichlorohydrin on dry starch.

b. The example was carried out using a corrosion inhibitor, Corrtreat 2001-29 as the oil well chemical and a starch acetate (1.5 DS) waxy maize starch.

c. The example was carried out using a scale inhibitor, Scaletreat 2001-26 as the oil well chemical and a microporous waxy maize starch which was digested using 0.3% glucoamylase on dry starch to achieve 15% digestion.

Example 4

This example illustrates compositions of the present invention using water insoluble oil well chemicals.

Water insoluble solids were formulated with starch at a 1:1 ratio (50% loading on starch). The oil well chemical was added to a waxy maize starch modified with 3% octenyl succinic anhydride and converted to a water fluidity of 40, and the mixture was homogenized for 1–2 minutes at 9000–10000 rpm, 20° C. (Silverson L4RT). Water was added to the emulsion and the mixture was further homogenized, 1 minute at 9000–10000 rpm, 20° C. (Silverson L4RT). The starch was then added to the solution and the mixture was further homogenized, 1–2 minutes at 9000–10000 rpm, 20° C. (Silverson L4RT). The mixture was spray dried (35% solids, 380° F. inlet temperature, 230° F. outlet temperature, 140–160 ml/minutes with dual wheel atomization using Bowen Lab Model (30"×36")) to produce a flowable, non-sticky composition.

a. The example was carried out using a wax inhibitor, Waxtreat 398 as the oil well chemical and a microporous waxy maize which was 30% digested with 0.3% glucoamylase, and modified with 3% octenly succinic anhydride and crosslinked with 1% aluminium sulfate.

b. The example was carried out using an asphaltene inhibitor, Waxtreat 7302 as the oil well chemical and a microporous waxy maize starch modified using 3% octenyl succinic anhydride, enzymatically treated using 0.3% glucoamylase, to achieve 30% digestion.

c. The example was carried out using hydrogen sulphide, Scavtreat 1020 as the oil well chemical and a high amylose corn starch, HYLON® VII starch, commercially available from National Starch and Chemical Company.

d. The example was carried out using a kinetic hydrate inhibitor, Hytreat 569 as the oil well chemical and a microporous (30% enzyme digested) waxy maize starch modified using 3% octenyl succinic anhydride, enzymatically treated using 0.3% glucoamylase.

e. The example was carried out using an anti-agglomerated hydrate inhibitor, Hytreat A560 as the oil well chemical and a cationic starch silanol, 0.3% Nitrogen, 0.4% silanol.

Example 5

This example shows further compositions representative of the present invention.

Starch was weighed out into a glass container. The oil well chemical was added while mixing for 5 minutes and then mixed for an additional 5 minutes, or until uniform using a Powerstat, Variable Autotransformer set at 80 (3PN168), Bodine Electric Co, Speed reducer motor (NSE-12R).

a. Starch used was a 50:50 blend of sago and tapioca, DD and the oil well chemical used was Waxtreat 398. The starch:chemical ratio used was 100:40 and the loading was 28.6%.

b. Starch used was a high amylose (70%) maize starch modified by 3% octenyl succinic anhydride and 10% polyvinyl alcohol and the oil well chemical used was Waxtreat 398. The starch:chemical ratio used was 100:80 and the loading was 44.4%.

c. Starch used was enzyme converted (alpha amylase) maltodextrin and the oil well chemical used was Trosquat. The starch:chemical ratio used was 100:38 and the loading was 27.5%.

d. Starch used was enzyme converted (alpha amylase) maltodextrin and the oil well chemical used was Troscat. The starch:chemical ratio used was 100:38 and the loading was 27.5%.

e. Starch used was a high amylose (70%) maize which was gelatinized, completely enzymatically debranched and retrograded and the oil well chemical used was Hytreat A560. The starch:chemical ratio used was 100:24 and the loading was 19.3.

While the invention has been described with particular reference to certain embodiments thereof, it will be understood that changes and modifications may be made by those of ordinary skill within the scope and spirit of the following claims.

What is claimed is:

1. A biodegradable controlled release chemical composition composing (a) a granular, pitted, particulate octenylsuccinate starch,
(b) at least one oil well chemical selected from the group consisting of friction reducers, corrosion inhibitors, wax inhibtors, hydrate inhibitors, gel breakers, tracers, surfactants, scale inhibitors, antifoaming agents, demulsifiers, pour point depressants, biocids, drag reducers, antioxidants, hydrogen sulfide sulfied scavengers, oxygen scavengers, deoilers, and asphaltene inhibitors, and
(c) an adjunct selected from the group consisting of a plasticizer, surfactant, filler, chelating agent, thickening agent, particulate, gelatin, gum arabic, zein, soy protein, and polymers/coplomers of polyethylene and polyvinyl chloride.

wherein the starch is chosen to release the chemical at 60° C.

2. A composition comprising a mixture of at least two compositions according to claim 1, wherein the chemicals are incompatible with one another.

* * * * *